(12) United States Patent
Kobayashi et al.

(10) Patent No.: US 11,312,362 B2
(45) Date of Patent: Apr. 26, 2022

(54) ELECTRIC DEVICE CONTROL METHOD AND ELECTRIC DEVICE

(71) Applicant: Nissan Motor Co., Ltd., Yokohama (JP)

(72) Inventors: Azusa Kobayashi, Kanagawa (JP); Kenichi Gotou, Kanagawa (JP); Kiyoshi Hoshi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 32 days.

(21) Appl. No.: 16/771,143

(22) PCT Filed: Dec. 15, 2017

(86) PCT No.: PCT/JP2017/045176
§ 371 (c)(1),
(2) Date: Jun. 9, 2020

(87) PCT Pub. No.: WO2019/116559
PCT Pub. Date: Jun. 20, 2019

(65) Prior Publication Data
US 2021/0162981 A1 Jun. 3, 2021

(51) Int. Cl.
*B60W 20/15* (2016.01)
*B60W 10/06* (2006.01)
*B60W 10/08* (2006.01)

(52) U.S. Cl.
CPC ............ *B60W 20/15* (2016.01); *B60W 10/06* (2013.01); *B60W 10/08* (2013.01); *B60W 2510/0638* (2013.01); *B60W 2510/242* (2013.01)

(58) Field of Classification Search
CPC ...... B60W 20/15; B60W 10/06; B60W 10/08; B60W 2510/0638; B60W 2510/242; B60W 60/00; B60W 2030/206; B60W 30/192; B60W 10/24; B60W 20/14; B60W 20/17; B60W 2710/0666; B60W 2710/0644; Y02T 10/70; Y02T 10/62; B60K 2006/268; B60K 6/46; B60K 6/24; B60K 6/26; B60K 1/04; B60Y 2200/92
(Continued)

(56) References Cited

U.S. PATENT DOCUMENTS

2010/0305820 A1* 12/2010 McGee ................ B60W 10/06
903/930
2011/0035135 A1* 2/2011 Schwalm ........ B60W 30/18072
701/110
(Continued)

FOREIGN PATENT DOCUMENTS

JP 2017-114206 A 6/2017

*Primary Examiner* — Yi-Kai Wang
(74) *Attorney, Agent, or Firm* — Young Basile Hanlon & MacFarlane, P.C.

(57) ABSTRACT

In an electric device control method and an electric device of the present invention, during a period in which a rotational speed of an internal combustion engine shifting from a non-combustion mode to a combustion mode is decreased to a rotational speed within a predetermined rotational-speed range by a first electric motor connected to the internal combustion engine, a torque generated by the internal combustion engine is set lower than a required torque within the predetermined rotational-speed range for the internal combustion engine in the combustion mode.

9 Claims, 5 Drawing Sheets

(58) Field of Classification Search
USPC .......................................................... 701/22
See application file for complete search history.

(56) References Cited

U.S. PATENT DOCUMENTS

| | | | | |
|---|---|---|---|---|
| 2014/0136039 A1* | 5/2014 | Tanishima | .............. | H01L 21/34 |
| | | | | 903/903 |
| 2015/0353074 A1* | 12/2015 | Kinoshita | ................ | B60K 6/24 |
| | | | | 903/905 |
| 2018/0237022 A1* | 8/2018 | Tsukamoto | ........... | F16H 63/502 |

* cited by examiner

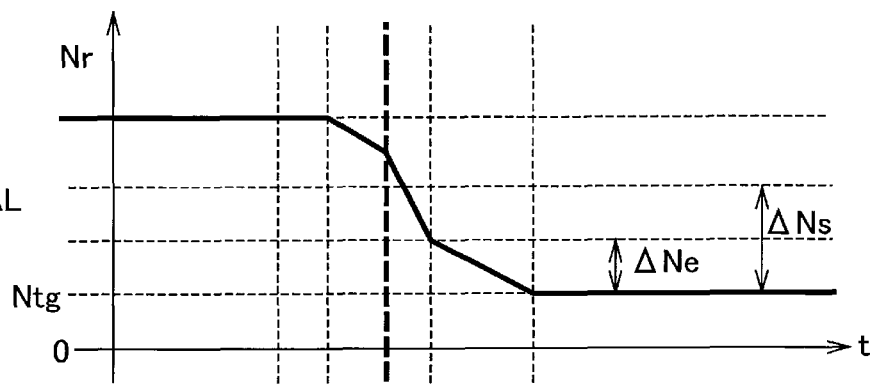

ENGINE COMMAND TORQUE

VEHICLE DRIVING FORCE

ADDITIONAL POWER

ELECTRIC DEVICE CONTROL METHOD AND ELECTRIC DEVICE

TECHNICAL FIELD

The present invention relates to an electric device control method and an electric device.

BACKGROUND

Japanese Patent Laid-Open Publication No. 2017-114206 discloses a regenerative control device that is capable of switching between motoring control and firing control. In the motoring control, a motor that rotates using regenerative power supplied from a device other than the motor is used to forcibly rotate an engine having its fuel supply shut off, to thereby consume the regenerative power. In the firing control, fuel is supplied to the engine to rotate the engine.

However, in the example disclosed in Japanese Patent Laid-Open Publication No. 2017-114206, there is a problem in that irregular sound is generated from an intake system of the engine when the motoring control is shifted to the firing control to decrease the engine rotational speed, having been increased to consume regenerative power during the motoring control, to a predetermined rotational speed by a motor torque.

SUMMARY

The present invention has been made in view of the above problems and it is an object of the present invention to provide an electric device control method and an electric device that minimize irregular sound from an intake system of an engine generated when motoring control is shifted to firing control and a rotational speed of the engine is decreased to a predetermined rotational speed by a motor torque.

In order to solve the above problems, in an electric device control method and an electric device according to an aspect of the present invention, during a period in which a rotational speed of an internal combustion engine shifting from a non-combustion mode to a combustion mode is decreased to a rotational speed within a predetermined rotational-speed range by a first electric motor, a torque generated by the internal combustion engine is set lower than a required torque within the predetermined rotational-speed range for the internal combustion engine in the combustion mode.

According to the present invention, it is possible to minimize irregular sound from an intake system of an engine generated when motoring control is shifted to firing control.

BRIEF DESCRIPTION OF THE DRAWINGS

FIGS. 4A-4D are timing charts illustrating a first example of torque limitation performed by the electric device according to the embodiment of the present invention, where FIG. 4A illustrates a change in engine rotational speed, FIG. 4B illustrates a change in accelerator opening, FIG. 4C illustrates a change in engine command torque, and FIG. 4D illustrates a change in vehicle driving force; FIG. 5A illustrates a change in engine command torque, FIG. 5B illustrates a change in vehicle driving force, and FIG. 5C illustrates a change in additional power.

DESCRIPTION OF EMBODIMENTS

Embodiments of the present invention are described below with reference to the accompanying drawings. In the explanations, like parts are denoted by like reference signs and redundant explanations thereof are omitted.

[Configuration of Electric Device]

Figure 1:
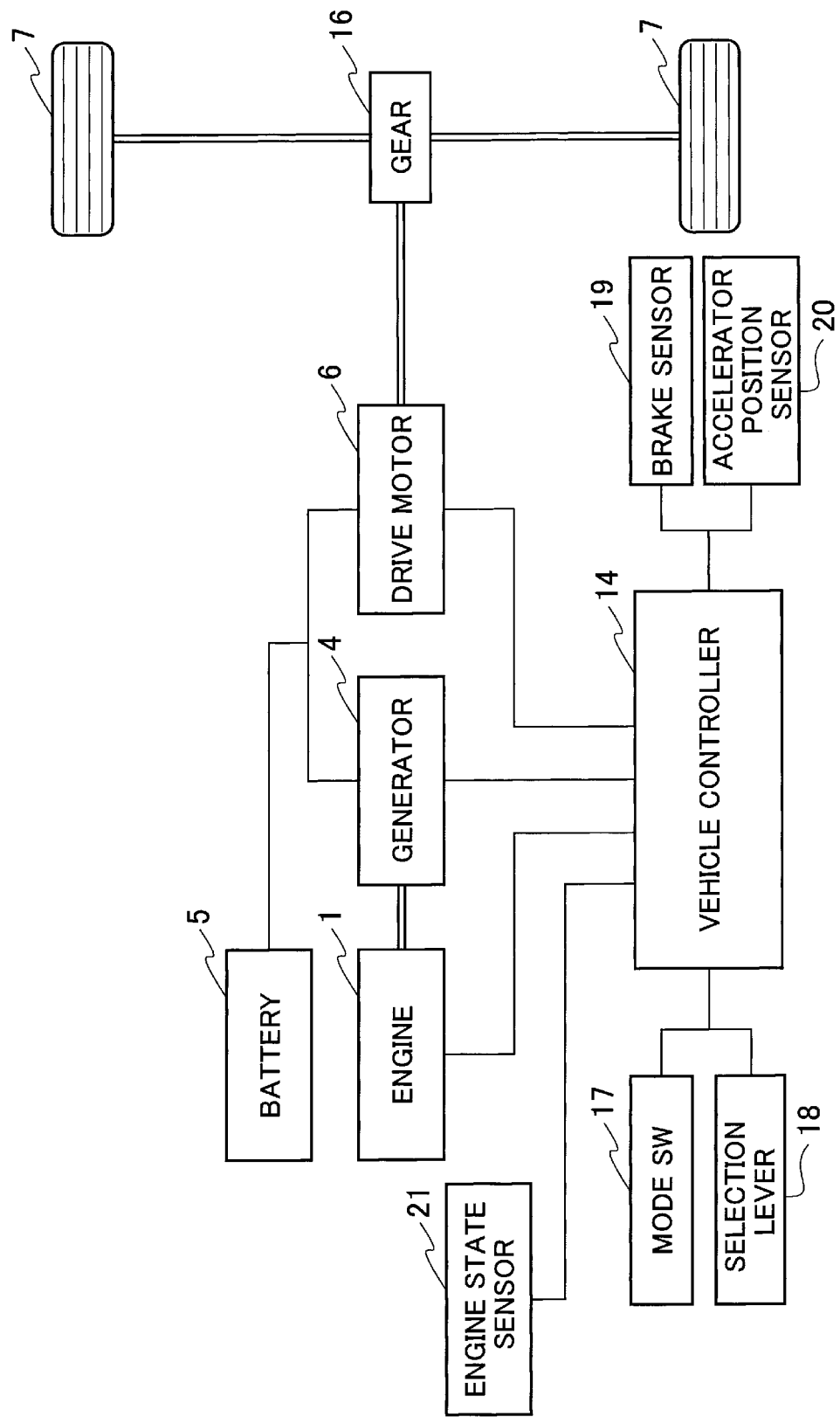
FIG. 1 is a block diagram illustrating a configuration of a hybrid car including an electric device according to an embodiment of the present invention.

A configuration of a hybrid car including an electric device according to an embodiment of the present invention is described with reference to FIG. 1. The hybrid car according to the present embodiment includes an engine 1 (internal combustion engine), a generator 4 (first electric motor), a battery 5, a drive motor 6 (second electric motor), and wheels 7 (drive wheels). In the hybrid car, the engine 1 does not drive the wheels 7, but the drive motor 6 drives the wheels 7 by using power from the battery 5. Since the engine 1, the battery 5, the drive motor 6, and the wheels 7 are connected in series (series connection), the hybrid car is referred to as "series hybrid car".

The engine 1 is mechanically connected with the generator 4. The generator 4 is connected to the battery 5 such that the generator 4 is capable of transmitting and receiving power to and from the battery 5. The generator 4 and the drive motor 6 are also connected such that it is possible to transmit and receive power between them. The battery 5 and the drive motor 6 are also connected such that it is possible to transmit and receive power between them. The drive motor 6 is mechanically connected with an axle through a gear 16. The axle is mechanically connected with the wheels 7.

A driving force of the engine 1 is transmitted to the generator 4, and the generator 4 rotates using the driving force of the engine 1 and generates power. When power generated by the generator 4 flows to the battery 5, this power is consumed for charging the battery 5. When power generated by the generator 4 flows to the drive motor 6, this power is consumed for driving of the drive motor 6.

The drive motor 6 is supplied with power from either one or both of the generator 4 and the battery 5. The drive motor 6 consumes the supplied power to generate a driving force. The driving force of the drive motor 6 is transmitted through the gear 16 and the axle to the wheels 7. The wheels 7 rotate using the driving force of the drive motor 6, so that the series hybrid car (hereinafter, abbreviated as "vehicle") runs.

In a case, such as during deceleration of the vehicle or when the vehicle is travelling downhill, where a torque is input from the wheels 7 through the axle and the gear 16 to the drive motor 6, and thus the drive motor 6 rotates using the input torque, the drive motor 6 operates as a generator to generate regenerative power. When regenerative power is generated in the drive motor 6, a reaction of the torque input to the drive motor 6 causes a regenerative brake force to be generated on the wheels 7 through the gear 16 and the axle.

When the regenerative power generated in the drive motor 6 flows to the battery 5, the regenerative power is consumed to charge the battery 5. When the regenerative power generated in the drive motor 6 flows to the generator 4, the regenerative power is consumed to drive the engine 1 and the generator 4 against a resistance of the engine 1 (engine braking).

The battery 5 has a charge and discharge function. When the battery 5 is charged, the battery 5 stores therein energy of the power supplied from the generator 4 or the drive motor 6. When the battery 5 is discharged, the battery 5 supplies the energy stored therein as power to the drive motor 6.

A power flow between the generator 4, the battery 5, and the drive motor 6 may change depending on the respective states of the battery 5 and the drive motor 6, travelling conditions of the vehicle, and other factors such as a power supply-demand status in the entire vehicle including auxiliary devices installed in the vehicle (such as an air-conditioner, a car stereo system, and a navigation system). A power flow between the generator 4, the battery 5, and the drive motor 6 is determined by control executed by a vehicle controller 14 described later.

For example, when the drive motor 6 needs to generate a driving force, it is allowable that power is supplied from the battery 5 to the drive motor 6. When sufficient power cannot be supplied from the battery 5 to the drive motor 6, it is allowable to drive the engine 1 to generate power in the generator 4, so that in addition to the power from the battery 5, the power from the generator 4 is also supplied to the drive motor 6.

When charging of the battery 5 is not completed, it is allowable that regenerative power, generated by the drive motor 6 during deceleration of the vehicle or when the vehicle is travelling downhill, is supplied from the drive motor 6 to the battery 5. Further, in a state where charging of the battery 5 is not completed, it is allowable to drive the engine 1 to generate power in the generator 4 and supply the power from the generator 4 to the battery 5.

When a state of charge (SOC) of the battery 5 is high, it is allowable that regenerative power, generated by the drive motor 6 during deceleration of the vehicle or when the vehicle is travelling downhill, is supplied to the generator 4. In this case, the regenerative power supplied from the drive motor 6 to the generator 4 is consumed by the generator 4 in order to work against the engine braking applied by the engine 1. As a result of this, the regenerative power supplied from the drive motor 6 to the generator 4 is forcibly discharged.

The vehicle further includes a mode switch 17 (a mode SW) that selects one of running modes, a selection lever 18 that is operated by a driver, a brake sensor 19 that detects a braking force, an accelerator position sensor 20 (APS) that detects an accelerator opening, an engine state sensor 21 that detects a state of the engine, and the vehicle controller 14 that controls the hybrid car in its entirety. The vehicle controller 14 functions as a control circuit that controls the electric device according to the present embodiment.

The vehicle controller 14 is electrically connected to each of the mode switch 17, the selection lever 18, the brake sensor 19, the accelerator position sensor 20, and the engine state sensor 21. The vehicle controller 14 receives a signal indicating a selected running mode from the mode switch 17, receives a signal indicating the selected range from the selection lever 18, receives a signal indicating the brake oil pressure from the brake sensor 19, and receives a signal indicating an accelerator opening Ac of an accelerator pedal (input device) from the accelerator position sensor 20.

The vehicle controller 14 further receives a signal indicating the state of the engine 1 from the engine state sensor 21. Examples of the signal indicating the state of the engine 1 include a signal indicating whether the engine 1 is supplied with fuel, and a signal indicating an engine rotational speed Nr.

Examples of the range that is selectable through the selection lever 18 include a drive range (D), a brake range (B), a reverse range (R), a neutral range (N), a parking range (P), and the like.

The vehicle controller 14 is electrically connected to the engine 1, the generator 4, and the drive motor 6 through a signal line. The vehicle controller 14 controls the engine 1, the generator 4, and the drive motor 6 in order to generate a required torque Tm (a vehicle driving force FD) in the drive motor 6 in accordance with the accelerator opening Ac. Particularly, the vehicle controller 14 transmits a command torque Tc to the engine 1.

The phrase "transmits a command torque Tc" includes controlling the engine 1 in such a manner that a torque output by the engine 1 becomes the command torque Tc. For example, the wording "transmits a command torque Tc" includes controlling the engine 1 in such a manner that a torque output by the engine 1 becomes the command torque Tc by changing the throttle opening of the engine 1, changing the air-fuel ratio, and changing the amount of fuel supplied to the engine 1.

The vehicle controller 14 controls the driving states of the engine 1, the generator 4, and the drive motor 6, and accordingly the states of other auxiliary devices (not illustrated) are determined, so that a power flow between the generator 4, the battery 5, and the drive motor 6 is determined.

The vehicle controller 14 can be implemented by, for example, a general-purpose microcomputer including a CPU (central processing unit), a memory, and an input/output unit. A computer program (a control program) that causes the microcomputer to function as the vehicle controller 14 is installed in the microcomputer so that the microcomputer executes the computer program. Due to this program, the general-purpose microcomputer functions as the vehicle controller 14.

In the present embodiment, the example is described in which the vehicle controller 14 is implemented by software. Apparently, it is also possible to configure the vehicle controller 14 by preparing dedicated hardware to performing each step of information processing described below. It is also allowable to configure each of the units (23, 25, 27, 31, and 33) included in the vehicle controller 14 by each individual hardware. It is further allowable that the vehicle controller 14 is used in combination with an electronic control unit (ECU) to be used for other vehicle-related controls.

Figure 2:
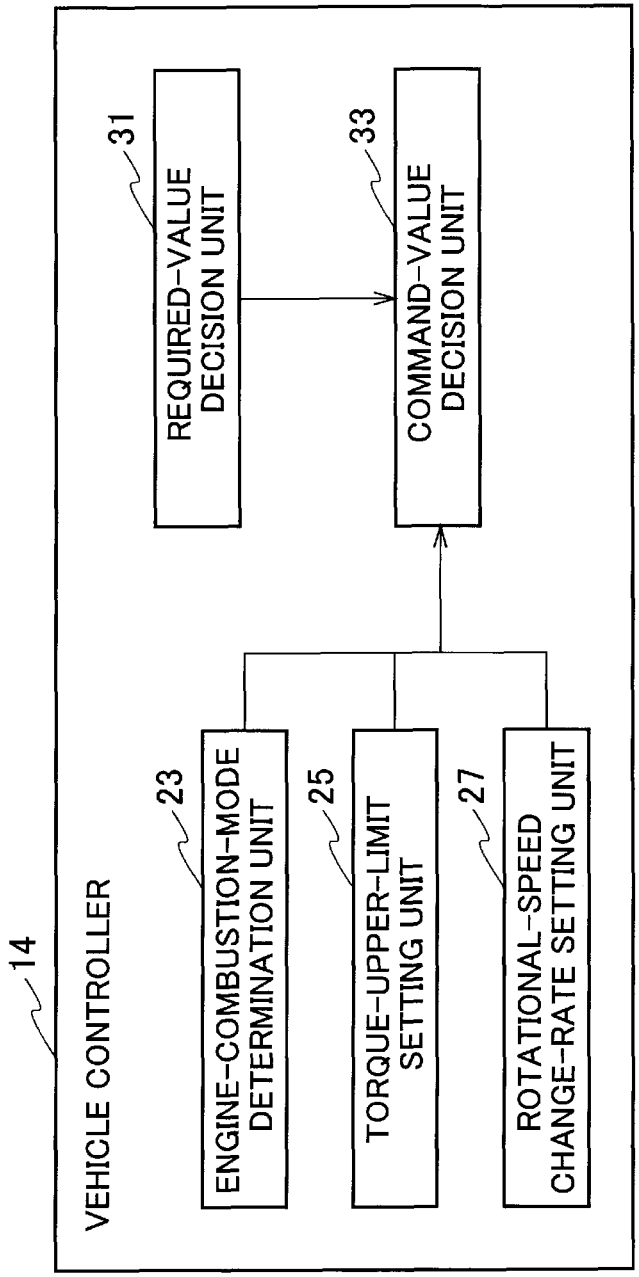
FIG. 2 is a block diagram illustrating functional constituent elements included in a vehicle controller.

Functional constituent elements included in the vehicle controller 14 are described below with reference to FIG. 2. The vehicle controller 14 includes functional constituent elements that are an engine-combustion-mode determination unit 23, a torque-upper-limit setting unit 25, a rotational-speed change-rate setting unit 27, a required-value decision unit 31, and a command-value decision unit 33.

The engine-combustion-mode determination unit 23 determines an engine mode of the engine 1 on the basis of a signal received from the engine state sensor 21 and indicating the state of the engine 1 (a signal indicating whether the engine 1 is supplied with fuel, and a signal indicating the engine rotational speed Nr). There are two possible types of engine modes for the engine 1, that is, "non-combustion mode" and "combustion mode".

The "non-combustion mode" refers to a mode in which the engine 1 is not supplied with fuel or air. The "combustion mode" refers to a mode in which the engine 1 is supplied with fuel and air, and the engine rotational speed Nr falls within a predetermined rotational-speed range. The predetermined rotational-speed range in the "combustion mode" is defined in consideration of characteristics of the engine 1 during firing. For example, the range of the engine rotational speed Nr, within which the engine 1 has improved fuel economy, is defined as a predetermined rotational-speed range.

When the engine 1 is in the "non-combustion mode", the engine 1 is not supplied with fuel. It is thus necessary to apply an external torque in order to rotate the driving-force output shaft of the engine 1. The output shaft of the engine 1 in the "non-combustion mode" is rotated by the generator 4 driven by being supplied with regenerative power generated in the drive motor 6. This makes it possible to forcibly discharge the regenerative power generated in the drive motor 6.

Rotating the output shaft of the engine by the electric motor in the manner as described above is referred to as "motoring control". In contrast, supplying fuel to the engine 1 and outputting a torque from the output shaft of the engine 1 is referred to as "firing control". The duration of the "non-combustion mode" does not always correspond with the duration of the "motoring control". The duration of the "combustion mode" does not always correspond with the duration of the "firing control".

The required-value decision unit 31 decides a required torque Tm to be generated in the drive motor 6 on the basis of the accelerator opening Ac received from the accelerator position sensor 20.

The required-value decision unit 31 decides a power, obtained by subtracting a power Pb available for supply from the battery 5 to the drive motor 6 from a power needed for the drive motor 6 to generate the required torque Tm, as a required power Pd for the generator 4. However, the required-value decision unit 31 decides the required power Pd as 0 (zero), where the power Pb available for supply from the battery 5 to the drive motor 6 is greater than the power needed for the drive motor 6 to generate the required torque Tm. Due to this decision, the value of the required power Pd for the generator 4 is equal to or greater than zero.

Further, the required-value decision unit 31 decides a torque needed for the generator 4 to generate the required power Pd as a required torque Ttg (predetermined torque threshold) for the engine 1.

The required-value decision unit 31 decides a power, obtained by subtracting a power available for supply from the battery 5 to auxiliary devices (not illustrated) installed in the vehicle from a power needed for charging the battery 5 and driving the auxiliary devices, as an auxiliary-device power shortage Pw. However, the required-value decision unit 31 decides the auxiliary-device power shortage Pw as zero, where the power available for supply from the battery 5 to the auxiliary devices installed in the vehicle is greater than the power needed for the auxiliary devices. Due to this decision, the value of the auxiliary-device power shortage Pw is equal to or greater than zero.

Furthermore, the required-value decision unit 31 decides a torque needed for the generator 4 to generate a total power of the required power Pd and the auxiliary-device power shortage Pw as a required torque Tap for the engine 1.

The required-value decision unit 31 decides a target rotational speed Ntg of the engine 1 in the "combustion mode". The value of the target rotational speed Ntg falls within the predetermined rotational-speed range in the "combustion mode".

The torque-upper-limit setting unit 25 sets a torque limitation value Tmax (a normal value Tn and a limitation value Tcr), which is an upper limit of the command torque Tc for the engine 1, on the basis of the engine mode determined by the engine-combustion-mode determination unit 23, the engine rotational speed Nr received from the engine state sensor 21, and the target rotational speed Ntg of the engine 1. The normal value Tn is a limitation value which is set to ensure safe driving of the engine 1 in consideration of a safety factor and other factors. The limitation value Tcr is smaller than the normal value Tn.

The rotational-speed change-rate setting unit 27 sets a rotational-speed drop rate Rdown (a normal value Rn and a limitation value Rcr) of the engine rotational speed Nr on the basis of the engine mode determined by the engine-combustion-mode determination unit 23, the engine rotational speed Nr received from the engine state sensor 21, and the target rotational speed Ntg of the engine 1. The limitation value Rcr set as the rotational-speed drop rate Rdown is different from the normal value Rn. The limitation value Rcr may be greater than the normal value Rn or may be smaller than the normal value Rn as necessary.

The command-value decision unit 33 compares the torque limitation value Tmax set by the torque-upper-limit setting unit 25 with the required torque Tap decided by the required-value decision unit 31, and decides whichever is smaller in value as the command torque Tc for the engine 1. The command torque Tc is thus set as a value not exceeding the torque limitation value Tmax.

Further, the command-value decision unit 33 decides a command rotational speed Nc for the engine 1 on the basis of the engine rotational speed Nr received from the engine state sensor 21, the target rotational speed Ntg decided by the required-value decision unit 31, and the rotational-speed drop rate Rdown set by the rotational-speed change-rate setting unit 27. Specifically, on a condition that the engine rotational speed Nr is decreased toward the target rotational speed Ntg, the command-value decision unit 33 decides the command rotational speed Nc such that the amount of decrease in the engine rotational speed Nr per unit time becomes equal to the rotational-speed drop rate Rdown.

The vehicle controller 14 controls the engine 1 on the basis of the command torque Tc and the command rotational speed Nc decided for the engine 1 in the manner as described above.

[Torque Limitation in Consideration of Engine Rotational Speed]

Next, a process procedure for torque limitation performed by the electric device according to the present embodiment is described with reference to the flowchart in FIG. 3.

Figure 3:
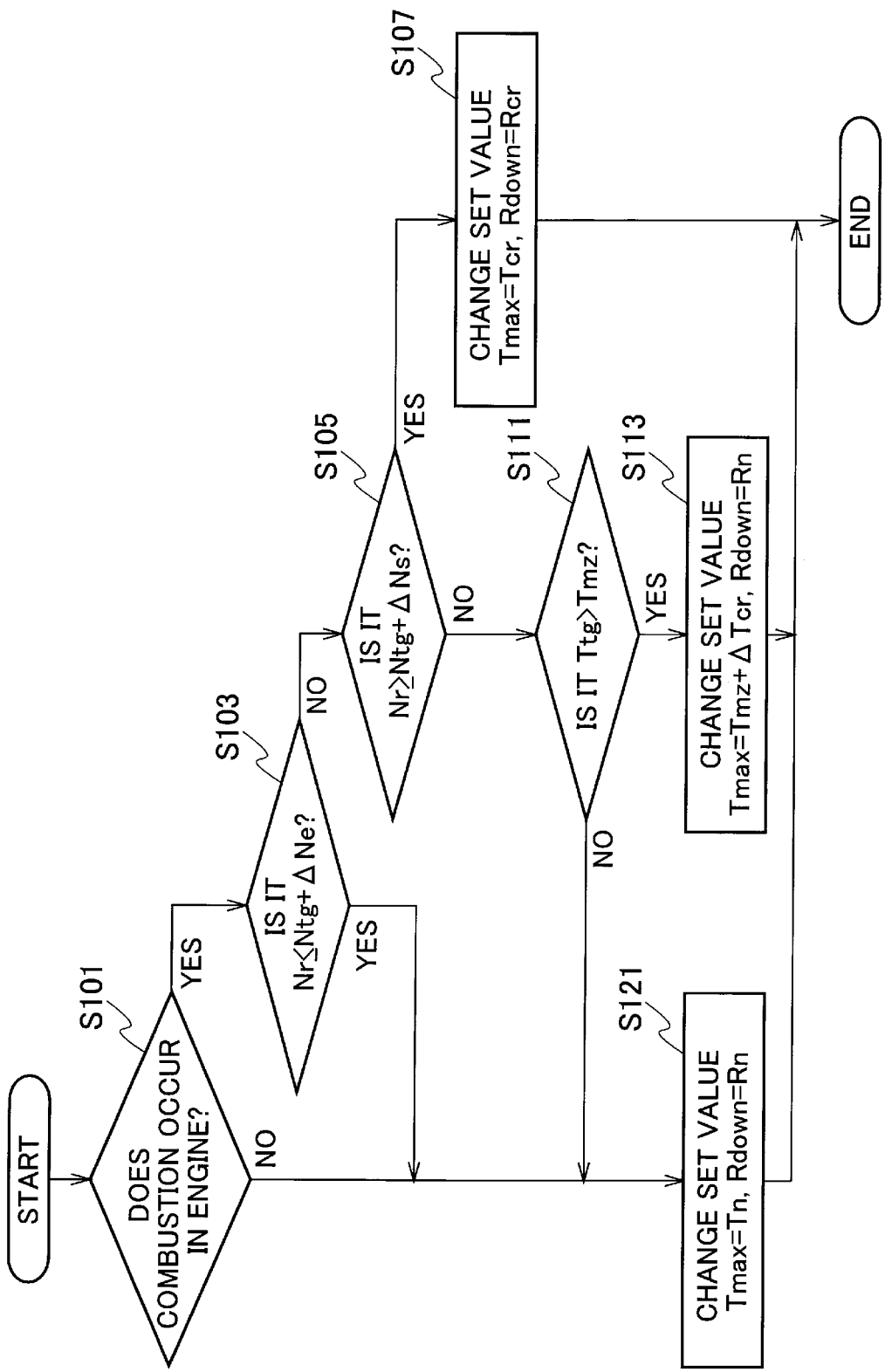
FIG. 3 is a flowchart illustrating a process procedure for torque limitation performed by the electric device according to the embodiment of the present invention.

The torque limitation processing illustrated in FIG. 3 is started when ignition of the vehicle is turned on, and is repeatedly performed until the ignition is turned off. Each time the torque limitation processing illustrated in FIG. 3 is performed, the command-value decision unit 33 decides the command torque Tc and the command rotational speed Nc for the engine 1.

As illustrated in FIG. 3, at Step S101, the vehicle controller 14 first determines whether combustion occurs in the engine 1. More specifically, the vehicle controller 14 determines whether the engine 1 is in either the "non-combustion mode" or the "combustion mode". When the engine 1 is in the "combustion mode" (YES at Step S101), the process advances to Step S103. In contrast, when the engine 1 is in the "non-combustion mode" (NO at Step S101), the process advances to Step S121.

Because torque limitation is not performed at Step S121, the normal value Tn is set as the torque limitation value Tmax, while the normal value Rn is set as the rotational-speed drop rate Rdown.

At Step S103, the vehicle controller 14 determines whether the engine rotational speed Nr is equal to or lower than a value obtained by adding a predetermined value ΔNe to the target rotational speed Ntg. The predetermined value ΔNe is a positive number. When "Nr≤Ntg+ΔNe" is established (YES at Step S103), the process advances to Step S121. When "Nr>Ntg+ΔNe" is established (NO at Step S103), the process advances to Step S105.

At Step S105, the vehicle controller 14 determines whether the engine rotational speed Nr is equal to or higher than a value obtained by adding a predetermined value ΔNs to the target rotational speed Ntg. The predetermined value ΔNs is a positive number. When "Nr≥Ntg+ΔNs" is established (YES at Step S105), the process advances to Step S107. When "Nr<Ntg+ΔNs" is established (NO at Step S105), the process advances to Step S111.

Because torque limitation is performed at Step S107, the limitation value Tcr is set as the torque limitation value Tmax, while the limitation value Rcr is set as the rotational-speed drop rate Rdown.

At Step S111, the vehicle controller 14 determines whether the value of the required torque Ttg for the engine 1 is greater than a previous torque limitation value Tmz. The previous torque limitation value Tmz refers to the previous value of the torque limitation value Tmax when the torque limitation processing illustrated in FIG. 3 is repeatedly performed. When "Ttg>Tmz" is established (YES at Step S111), the process advances to Step S113. When "Ttg≤Tmz" is established (NO at Step S111), the process advances to Step S121.

At Step S113, a predetermined value ΔTcr is added to the previous torque limitation value Tmz. Each time the torque limitation processing illustrated in FIG. 3 is repeatedly performed, the torque limitation value Tmax is incremented by the predetermined value ΔTcr. That is, the torque limitation value Tmax is incremented by the predetermined value ΔTcr per unit step.

Processes at Steps S111 and S113 are not essential. It is allowable that when the determination is NO at Step S105, the process advances to Step S121.

[First Example of Torque Limitation]

Next, a first example of torque limitation performed by the electric device according to the present embodiment is described with reference to the timing charts in FIGS. 4A to 4D. FIG. 4A illustrates a change in the engine rotational speed Nr, FIG. 4B illustrates a change in the accelerator opening Ac, FIG. 4C illustrates a change in the command torque Tc for the engine 1, and FIG. 4D illustrates a change in the vehicle driving force FD.

The timing charts in FIGS. 4A to 4D illustrate a case where during the period before a time t1, the motoring control is executed on the engine 1, at a time t2, the engine 1 starts-up, and during the period after the time t2, the firing control is executed on the engine 1. As illustrated in FIG. 4D, during the period before the time t1, as a result of the motoring control executed on the engine 1, the vehicle driving force FD is a negative driving force (brake force). As illustrated in FIG. 4B, at a timing of a time t0, the accelerator pedal is pressed and thereby the accelerator opening Ac begins increasing from zero.

Since the engine 1 is not supplied with fuel under the motoring control, the engine 1 is in the "non-combustion mode" during the period before the time t1. The engine 1 is in the "combustion mode" during the period after the time t4 which is the timing at which the engine rotational speed Nr becomes the target rotational speed Ntg.

The time t2 is a timing at which the engine 1 is supplied with fuel and starts driving. At the time t2, the engine 1 is switched from the "non-combustion mode" to the "combustion mode".

For simplicity of description, the auxiliary-device power shortage Pw is assumed to be zero.

As illustrated in FIG. 4A, under the motoring control, regenerative power supplied from the drive motor 6 to the generator 4 is forcibly discharged. Thus, the engine rotational speed Nr of the engine 1 is higher than the target rotational speed Ntg in the "combustion mode". The period from the time t1 to the time t4 is the state transition period from the motoring control to the firing control, during which the engine rotational speed Nr of the engine 1 is decreased. During the transition from the motoring control to the firing control, while the generator 4 generates power, the engine rotational speed Nr of the engine 1 is decreased by a torque of the generator 4 to the predetermined rotational-speed range appropriate to the power generation.

When the accelerator opening Ac begins increasing from zero at the time t0, the vehicle driving force FD, which has been a brake force under the motoring control, begins increasing in accordance with the accelerator opening Ac. When the vehicle driving force FD becomes zero at the time t1, it is unnecessary to generate a brake force. Thus, the motoring control is ended. The accelerator opening Ac at the time when the vehicle driving force FD becomes zero is called "neutral point". The neutral point corresponds to a state where the drive motor 6 does not generate a positive driving force or a negative driving force.

After a lapse of time from the time t1, at the time t2 when the accelerator opening AC reaches a predetermined value at which the engine 1 starts-up, driving of the engine 1 is started.

From the time t2 at which driving of the engine 1 is started, if the required torque Ttg greater than the torque limitation value Tmax is output as the command torque Tc, irregular sound is generated from the engine 1. For this reason, it is necessary to perform torque limitation intended to limit the command torque Tc to a torque lower than a normal output torque.

As illustrated in FIG. 4A, at the time t2, "Nr>Ntg+ΔNe" and "Nr≥Ntg+ΔNs" are established. Thus, since torque limitation is started from the time t2, the limitation value Tcr is set as the torque limitation value Tmax, while the limitation value Rcr is set as the rotational-speed drop rate Rdown. As illustrated in FIG. 4C, the command torque Tc is limited by the torque limitation value Tmax, and consequently the command torque Tc is the limitation value Tcr set at Step S107 in FIG. 3 during the period from the time t2 to the time t3.

As described above, whether to perform torque limitation at the timing of driving of the engine 1 is determined by the engine rotational speed Nr and the target rotational speed Ntg. When "Nr<Ntg+ΔNs" is established (that is, when the engine rotational speed Nr is not significantly higher than the target rotational speed Ntg, or when the engine rotational speed Nr is equal to or lower than the target rotational speed Ntg), torque limitation is not performed.

After a lapse of time from the time t2, the engine rotational speed Nr is decreased, and consequently "Nr=Ntg+ΔNe" is established at the time t3. After the time t3, the torque limitation value Tmax increases from the limitation value Tcr. More specifically, the torque limitation value Tmax is incremented by the predetermined value ΔTcr per unit step. As illustrated in FIG. 4C, the command torque Tc is limited by the torque limitation value Tmax, and consequently the command torque Tc is the limitation value set at Step S113 in FIG. 3 during the period from the time t3 to the time t4.

The reasons why the torque limitation value Tmax is incremented by the predetermined value ΔTcr during the period from the time t3 to the time t4 are that a change in driving force generated by the engine 1 affects the amount of power generated in the generator 4, and affects the feeling of acceleration sensed by vehicle occupants through the vehicle driving force FD in the drive motor 6. In order to reduce variations in the feeling of acceleration sensed by vehicle occupants, the rate of change in the torque limitation value Tmax is limited by the predetermined value ΔTcr.

From the time t3 to the time t4, the command torque Tc is increased by ΔTs. When "Ttg≤Tmz" is established ("Tc=Ttg" is established) at the time t4, the normal value Tn is set as the torque limitation value Tmax, while the normal value Rn is set as the rotational-speed drop rate Rdown. Consequently, the torque limitation is ended.

[Second Example of Torque Limitation]

Figure 5A:
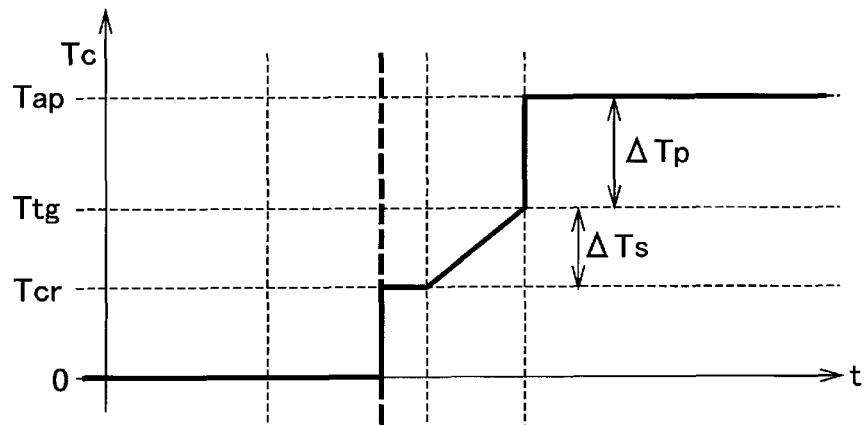
FIGS. 5A-5C are timing charts illustrating a second example of torque limitation performed by the electric device according to the embodiment of the present invention, where

Next, a second example of torque limitation performed by the electric device according to the present embodiment is described with reference to the timing charts in FIGS. 5A to 5C. FIG. 5A illustrates a change in engine command torque, FIG. 5B illustrates a change in vehicle driving force, and FIG. 5C illustrates a change in additional power.

Figure 5B:
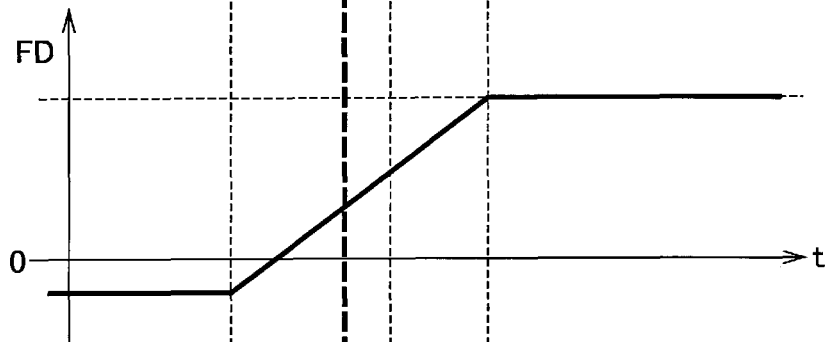
Figure 5C:
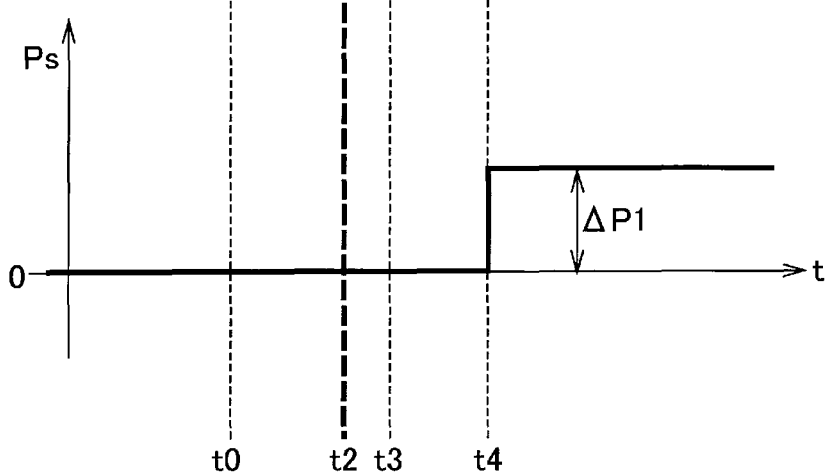

The timing charts in FIGS. 5A to 5C are different from the timing charts illustrated in FIGS. 4A to 4D in that the timing charts illustrate the case where the auxiliary-device power shortage Pw is not zero. As compared to the change in engine command torque illustrated in FIG. 4C, the engine command torque illustrated in FIG. 5A is changed in the same manner as illustrated in FIG. 4C at and before the time t4. However, the engine command torque is changed differently from that illustrated in FIG. 4C after the torque limitation is cancelled at the time t4. When the auxiliary-device power shortage Pw is not zero, the engine 1 is required to make up for a power shortage in the auxiliary devices. Thus, it is necessary to increase the command torque Tc for the engine 1 to the required torque Tap that is greater than the required torque Ttg by ΔTp.

Unlike the case where the command torque Tc is increased from the limitation value Tcr to the required torque Ttg (when incremented by ΔTcr), the command torque Tc is increased from the required torque Ttg to the required torque Tap. This case does not cause any problem despite an abrupt increase in the command torque Tc. A change in driving force generated by the engine 1 may affect the feeling of acceleration sensed by vehicle occupants during the period at and before the time t4. The change in the command torque Tc after the time t4 does not cause a change in the vehicle driving force FD of the drive motor 6 (FIG. 5B). The change in the command torque Tc after the time t4 is intended to affect the change in additional power Ps obtained by subtracting a power supplied to the drive motor 6 from a power generated by the generator 4.

As illustrated in FIG. 5C, immediately after the time t4, the additional power Ps is increased by ΔP1. As a result of this increase, it is possible for the generator 4 to make up for the auxiliary-device power shortage Pw in addition to the required power Pd. In FIG. 5C, "ΔP1=Pw" holds.

Effects of the Embodiment

As described above in detail, during the transition period of the engine 1 (internal combustion engine) from the "non-combustion mode" to the "combustion mode" during which the engine rotational speed Nr of the engine 1 is decreased by the generator 4 (first electric motor) connected to the engine 1 to the target rotational speed Ntg that falls within the predetermined rotational-speed range, the electric device control method and the electric device according to the present embodiment perform torque limitation to set the torque (the command torque Tc) generated by the engine 1 so as to become lower than the required torque Ttg within a predetermined rotational-speed range for the engine 1 in the "combustion mode". This operation can reduce irregular sound from the intake system of the engine 1 generated when the motoring control is shifted to the firing control and the rotational speed of the engine 1 is decreased to the predetermined rotational-speed range by a motor torque. The reduction in irregular sound can reduce vehicle occupants' discomfort.

During the transition period of the engine 1 (internal combustion engine) from the "non-combustion mode" to the "combustion mode", the engine torque of the engine 1 in the "combustion mode" is increased to the required torque Ttg within the predetermined rotational-speed range. That is, the torque limitation to set the torque (the command torque Tc) generated by the engine 1 so as to become lower than the required torque Ttg during this transition period is intended to limit the engine torque being increased, and does not involve a decrease in the engine torque. In contrast to this, after having reached the required torque Ttg within the predetermined rotational-speed range, if the torque generated by the engine 1 is limited to a torque lower than the required torque Ttg, the engine torque is significantly varied. That is, the torque limitation during the transition period does not involve a decrease in the engine torque, and thus a change in the driving force is insignificant. Accordingly, irregular sound generated from the intake system of the engine 1 can be reduced without occupants having a sense of discomfort.

In the electric device control method and the electric device according to the present embodiment, the rotational-speed drop rate Rdown (rotational-speed decrease rate) of the engine 1 when the torque limitation is performed may be set higher than the rotational-speed drop rate Rdown of the engine 1 in the "combustion mode". This setting can reduce the period during which the engine rotational speed Nr is decreased to a rotational speed within the predetermined rotational-speed range, and can also reduce the duration of irregular sound from the intake system of the engine 1 generated when the motoring control is shifted to the firing control. Consequently, irregular sound from the intake system of the engine 1 can be reduced, and this can reduce vehicle occupants' discomfort.

Further, in the electric device control method and the electric device according to the present embodiment, the rotational-speed drop rate Rdown (rotational-speed decrease rate) of the engine 1 when the torque limitation is performed may be set lower than the rotational-speed drop rate Rdown of the engine 1 in the "combustion mode". Due to this setting, the engine rotational speed Nr changes smoothly during the period in which the engine rotational speed Nr is decreased to a rotational speed within the predetermined rotational-speed range, so that the level of irregular sound from the intake system of the engine 1 can be decreased. Consequently, irregular sound from the intake system of the engine 1 can be reduced. This can reduce vehicle occupants' discomfort.

In the electric device control method and the electric device according to the present embodiment, when the difference between the engine rotational speed Nr and the target rotational speed Ntg is below the predetermined value ΔNe, the torque limitation may be cancelled, and the torque generated by the engine 1 may be increased to a required torque for the engine 1. Due to this operation, the state of the engine 1 has changed after the start of torque limitation intended to reduce the irregular sound, and thus the engine 1 can be determined to have reached the state where it is not necessary to continue performing the torque limitation on the engine 1. As a consequence, the torque limitation can be cancelled and the engine 1 can be controlled so as to output a required torque for the engine 1.

Further, in the electric device control method and the electric device according to the present embodiment, after the torque limitation is cancelled, until the torque generated by the engine 1 is increased to the required torque Ttg (predetermined torque threshold), the torque generated by the engine 1 may be limited such that the increase rate of the torque generated by the engine 1 does not exceed the predetermined value ΔTcr (predetermined limitation value). This operation can prevent the torque generated by the engine 1 from sharply increasing after the torque limitation is cancelled. Consequently, this can reduce variations in the feeling of acceleration sensed by vehicle occupants through variations in the vehicle driving force FD generated by the drive motor 6.

In the electric device control method and the electric device according to the present embodiment, a torque generated by the engine 1 in order for the generator 4 to generate the required power Pd needed for driving the vehicle may be set as the predetermined torque threshold. Further, a power, obtained by subtracting the power Pb available for supply from the battery installed in the vehicle from the power needed for the drive motor 6 (second electric motor) to generate the torque needed for driving the vehicle, may be set as the required power Pd needed for driving the vehicle. Due to these settings, the period during which a torque generated by the engine 1 is prevented from sharply increasing after the cancellation of torque limitation can be limited to a period during which the power generated by the generator 4 is increased to the required power Pd. As a result of this, it is possible to sharply increase the torque generated by the engine 1 after the power generated by the generator 4 is increased to the required power Pd. Also, while variations in the feeling of acceleration sensed by vehicle occupants are reduced, the generator 4 can immediately supply power to make up for the auxiliary-device power shortage Pw (a power obtained by subtracting a power available for supply from the battery 5 to auxiliary devices installed in the vehicle from a power needed for charging the battery 5 and driving the auxiliary devices). The generator 4 supplies power to make up for the auxiliary-device power shortage Pw so that the battery can be charged immediately and the auxiliary devices can be driven immediately.

In the electric device control method and the electric device according to the present embodiment, when the vehicle shifts from deceleration to acceleration, the torque limitation is performed. The motoring control executed during deceleration of the vehicle is shifted to the firing control executed during acceleration of the vehicle, and accordingly the engine 1 is shifted from the "non-combustion mode" to the "combustion mode". It is thus possible to more accurately control the timing of performing the torque limitation. Consequently, this can reduce irregular sound from the intake system of the engine 1 generated when the motoring control is shifted to the firing control. Further, the reduction in irregular sound can reduce vehicle occupants' discomfort.

Although the contents of the present invention have been described above with reference to the embodiments, the present invention is not limited to these descriptions, is and it will be apparent to those skilled in the art that various modifications and improvements can be made. It should not be construed that the present invention is limited to the descriptions and the drawings that constitute a part of the present disclosure. On the basis of the present disclosure, various alternative embodiments, practical examples, and operating techniques will be apparent to those skilled in the art.

It is needless to mention that the present invention also includes various embodiments that are not described herein. Therefore, the technical scope of the present invention is to be defined only by the invention specifying matters according to the scope of claims appropriately obtained from the above descriptions.

Respective functions described in the above embodiments may be implemented by one or more processing circuits. The processing circuits include programmed processors such as a processor including an electric circuit. The processors also include devices such as an application specific integrated circuit (ASIC) and conventional circuit elements that are arranged to execute the functions described in the embodiments.

REFERENCE SIGNS LIST

1 engine
4 generator
5 battery
6 drive motor
7 wheels
14 vehicle controller
16 gear
17 mode switch
18 selection lever
19 brake sensor
20 accelerator position sensor
21 engine state sensor
23 engine-combustion-mode determination unit
25 torque-upper-limit setting unit
27 rotational-speed change-rate setting unit
31 required-value decision unit
33 command-value decision unit

The invention claimed is:

1. An electric device control method wherein
an electric device including an internal combustion engine and a first electric motor connected to the internal combustion engine performs torque limitation during a period in which the internal combustion engine is shifted from a non-combustion mode to a combustion mode, and during the period, a rotational speed of the internal combustion engine is decreased to a rotational speed within a predetermined rotational-speed range by the first electric motor, the torque limitation being performed to set a torque generated by the internal combustion engine so as to become lower than a required torque within the predetermined rotational-speed range for the internal combustion engine in the combustion mode.

2. The electric device control method according to claim 1, wherein a rotational-speed decrease rate of the internal combustion engine when the torque limitation is performed is set higher than a rotational-speed decrease rate of the internal combustion engine in the combustion mode.

3. The electric device control method according to claim 1, wherein a rotational-speed decrease rate of the internal combustion engine when the torque limitation is performed is set lower than a rotational-speed decrease rate of the internal combustion engine in the combustion mode.

4. The electric device control method according to claim 1, wherein, when a difference between a rotational speed of the internal combustion engine and a target rotational speed that falls within the predetermined rotational-speed range is below a predetermined value, the torque limitation is cancelled, and a torque generated by the internal combustion engine is increased to the required torque.

5. The electric device control method according to claim 4, wherein after the torque limitation is cancelled, until a torque generated by the internal combustion engine is increased to a predetermined torque threshold, a torque generated by the internal combustion engine is limited such that an increase rate of the torque generated by the internal combustion engine does not exceed a predetermined limitation value.

6. The electric device control method according to claim 5, wherein the predetermined torque threshold is a torque generated by the internal combustion engine in order for the first electric motor to generate a required power needed for driving a vehicle having the electric device installed therein.

7. The electric device control method according to claim 6, wherein the required power is a power obtained by subtracting a power available for supply from a battery installed in the vehicle from a power needed for a second electric motor to generate a torque needed for driving the vehicle.

8. The electric device control method according to claim 1, wherein, when a vehicle having the electric device installed therein shifts from deceleration to acceleration, the torque limitation is performed.

9. An electric device including an internal combustion engine and a first electric motor connected to the internal combustion engine, the electric device comprising:
 a control circuit that performs torque limitation during a period in which the internal combustion engine is shifted from a non-combustion mode to a combustion mode, and during the period, a rotational speed of the internal combustion engine is decreased to a rotational speed within a predetermined rotational-speed range by the first electric motor, wherein
 the torque limitation is performed to set a torque generated by the internal combustion engine so as to become lower than a required torque within the predetermined rotational-speed range for the internal combustion engine in the combustion mode.

* * * * *